June 5, 1956 — J. M. NEIL — 2,748,816
SCREW HOLDING SCREW DRIVER
Filed Jan. 9, 1953
FIGURE 1
FIGURE 2
FIGURE 3
FIGURE 4
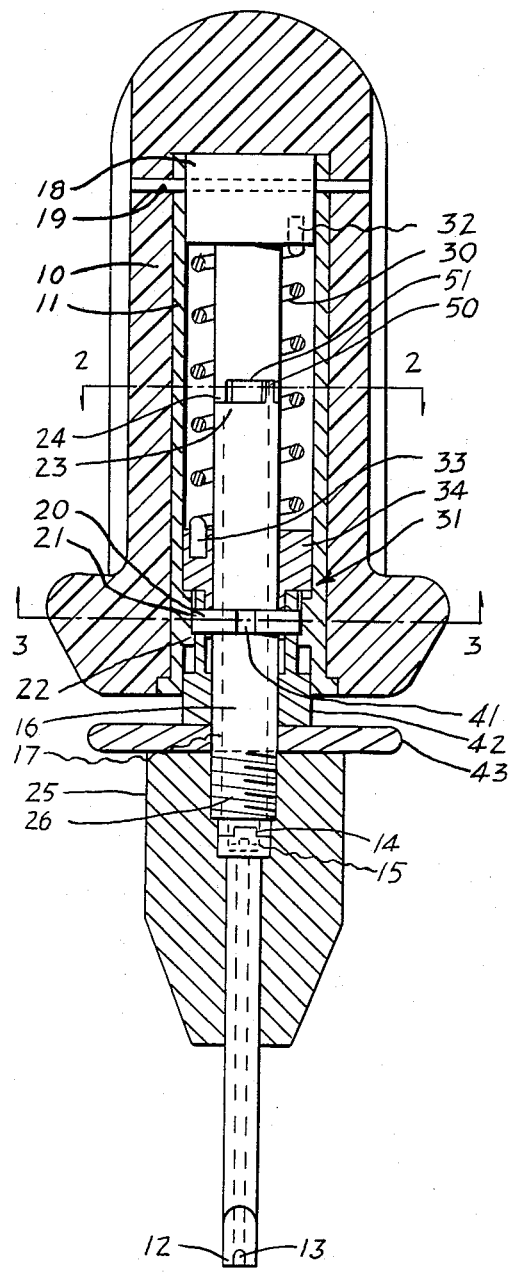
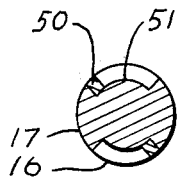
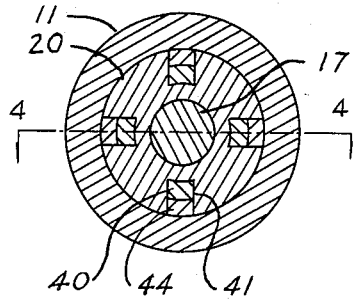
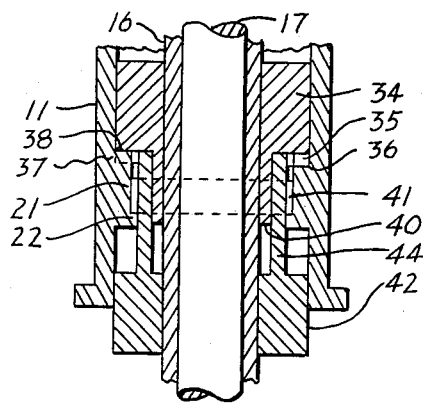
James M. Neil
INVENTOR.
BY
ATTORNEY

# United States Patent Office 2,748,816
Patented June 5, 1956

2,748,816
SCREW HOLDING SCREW DRIVER
James M. Neil, Oakland, Calif.

Application January 9, 1953, Serial No. 330,475

5 Claims. (Cl. 145—50)

This invention relates to tools for handling screws, and particularly to that type of screw driver which has a screw holding means.

The invention will be disclosed as embodied in a screw driver having a bifurcated bit, within which is an element which cooperates with the bit in gripping a screw. This element is rigidly secured to the handle and the bit is adapted to be rotated relative thereto by a torsion spring, such rotation being controlled by a clutch.

Among the advantages of this construction over the prior art is that the screw-holding means is under easy finger-tip control and does not require any awkward turning or twisting; also, it is easier to operate because the operator does not have to contend with a screw-holding member that is moving axially while he is attempting to attach the screw to the screw driver.

Other advantages will appear after the following detailed description by reference to the drawings where:

Figure 1 is a longitudinal section through the tool.

Figure 2 is a transverse section taken as indicated by line 2—2 in Figure 1.

Figure 3 is a transverse section taken as indicated by line 3—3 in Figure 1.

Figure 4 is a section taken as indicated by line 4—4 in Figure 3.

The screw driver has a plastic handle 10 which has secured therein a metal cylinder 11. The screw driver also has a bifurcated bit 12 within which is disposed the gripping element 13. The two members 12, 13 are removable and are coupled at 14, 15, respectively, to operating members 16, 17, respectively, so that when assembled the bit 12 is mechanically integral with bit-operating member 16, and gripping element 13 with its operating member 17.

The member 17 is a shaft which is rigidly secured to the handle and for this purpose is provided at its upper end with an enlarged cylindrical portion 18 which is held immovable in the cylinder 11 by a pin 19. Thus, the gripping element 13 is, in effect, an integral part of the handle 10.

Bit 12 is rotatable on gripping element 13, and bit-operating member 16 is rotatable with respect to shaft 17, and also with respect to the handle 10. The member 16 is a sleeve with a collar 20 formed thereon which seats in a bearing 21 in the cylinder 11. Axial displacement of sleeve 16 is prevented by an annular shoulder 22 engaging the collar 20 and by an annular shoulder 24 on the shaft 17 engaging the upper end 23 of the sleeve. Thus, the bit is rotatable with respect to the handle but incapable of axial movement therein.

The couplings 14, 15, are maintained in engagement by a nose 25 threaded at 26 on the lower end of the sleeve 16.

The bit-operating sleeve 16 is adapted to be rotated clockwise (viewed from the top of the screw driver in Figure 1) by a torsion-compression spring 30 and is normally restrained from being rotated clockwise by a normally-closed one-way clutch 31. The upper end 32 of spring 30 is anchored in portion 18 of shaft 17; the lower end 33 in clutch member 34.

Clutch 31 comprises clutch member 34 having ratchet teeth meshing with complementary ratchet teeth on cylinder 11. The ratchet teeth 35 (Figure 4) are formed in an annular skirt 36 on clutch member 34; the ratchet teeth 37 are formed in an annular shoulder 38 in the cylinder 11. Clutch member 34 (Figure 1) is loosely mounted on sleeve 16 so that it may move axially thereon. It is also rotatable in cylinder 11. Spring 30 presses clutch member 34 downwardly, so that clutch teeth 35 and 37 are normally in mesh and the clutch 31 is normally closed. Spring 30 also tends to turn clutch member 34 clockwise, but ratchet teeth 35 and 37 are arranged to oppose clockwise rotation of clutch member 34 with respect to cylinder 11. When counter-clockwise torque (sufficient to overcome spring 30) is applied to clutch member 34 the ratchet teeth 35 and 37 cam out of mesh and the clutch member 34 rotates counter-clockwise in the cylinder 11.

The clutch member 34 is constantly coupled to bit-operating sleeve 16. Fingers 40 (Figures 3 and 4) on clutch member 34 lie in notches 41 in collar 20 which is integral with sleeve 16, so that clutch member 34 may move axially on sleeve 16 but may not rotate thereon. By this means torque from spring 30 can be transmitted to the bit to turn it clockwise to grip the screw; and, conversely, torque from the bit may be transmitted to the clutch member to turn it counter-clockwise to release the screw.

The clutch 31 is provided with a control which consists of a collar 42 (Figure 1) slidable on the sleeve 16 and a disk 43 loosely mounted on the sleeve 16 which is accessible to the operator's finger tip. The collar 42 has fingers 44 (Figures 3 and 4) which extend upwardly through the notches 41 to engage the clutch member 34.

There is a limit coupling between the sleeve 16 and shaft 17 comprising tongues 50 (Figures 1 and 2) on sleeve 16 projecting into arcuate grooves 51 in shaft 17.

The screw driver operates as follows: The bit 12 and the element 13 are normally flush and the screw driver is conditioned as a standard screw driver. To attach a screw to the screw driver the operator inserts the bit in the slot of the screw and trips the control 43 with his finger tip to open the clutch 31, whereupon the bit is rotated clockwise by the spring 30 until the screw is in the grip of the bit 12 and element 13. When this occurs the tongues 50 (Figure 2) rotate clockwise in the grooves 51. After the screw is in the grip of the screw driver the operator releases the control and the spring closes the clutch thereby locking the screw on the screw driver.

If the operator should wish to release the screw he may turn the nose 25 counter-clockwise whereupon the clutch 31 opens. He continues turning until the tongues 50 have returned counter-clockwise to their original positions in the grooves 51. During this operation the spring is re-energized, the bit 12 and its element 13 are restored to their original relationship and the screw is freed.

When, after attaching a screw to the screw driver, the operator starts it into the threaded hole, the screw remains in the grip of the screw driver until the resisting force on the bit is sufficient to arrest it, whereupon, as the operator continues to turn the handle clockwise the clutch automatically opens and the shaft 17 turns clockwise in the sleeve 16 until the ends of the grooves 51, rotating clockwise (Figure 2) relative to the stationary tongues 50, again contact the tongue 50, after which torque from the handle is transmitted directly from shaft 17 to sleeve 16. Meanwhile, the spring has been re-energized and the bit 12 and its element 13 have been restored to normal to release their grip on the screw. The screw driver

I claim:

1. A screw driver having a handle, a bit, means for mounting said bit in said handle, said mounting means permitting rotation of said bit relative to said handle and preventing axial displacement of said bit relative to said handle, an element within said bit adapted to cooperate therewith for gripping a screw, means for rigidly securing said element to said handle, a torsion spring for rotating said bit relative to said handle in one direction, a one-way clutch between said bit and said handle for preventing said bit from rotating relative to said handle in said one direction and for permitting said handle to rotate relative to said bit in said one direction to enable force applied by the operator to said handle when a screw is tightened to be utilized for reenergizing said spring.

2. A screw driver having a handle, a bit, means for mounting said bit in said handle, said mounting means permitting rotation of said bit relative to said handle and preventing axial displacement of said bit relative to said handle, an element within said bit adapted to cooperate therewith for gripping a screw, means for rigidly securing said element to said handle, a torsion spring for rotating said bit relative to said handle in one direction, a one-way clutch between said bit and said handle for preventing said bit from rotating relative to said handle in said one direction, a manual control for releasing said clutch, said one-way clutch automatically releasing to permit said bit to rotate in a direction opposite to said one direction relative to said handle to reenergize said spring.

3. A screw driver having a handle, a bit, means for mounting said bit in said handle, said mounting means permitting rotation of said bit relative to said handle and preventing axial displacement of said bit relative to said handle, an element within said bit adapted to cooperate therewith for gripping a screw, means for rigidly securing said element to said handle, normally-restrained spring-urged means for rotating said bit, a control manually operable to release said spring-urged means, and means automatically operable when said handle is turned to tighten a screw to enable force applied by the operator to said handle when a screw is tightened to be utilized for restoring said spring-urged means to normally-restrained condition.

4. A screw driver having a handle, a bit, means for mounting said bit in said handle, said mounting means permitting rotation of said bit relative to said handle and preventing axial displacement of said bit relative to said handle, an element within said bit adapted to cooperate therewith for gripping a screw, means for rigidly securing said element to said handle, a spring for rotating said bit, a clutch comprising a clutch member on said handle and a clutch member on said bit, said spring urging said clutch member on said bit into engagement with said clutch member on said handle, said clutch members when in engagement preventing said spring from rotating said bit relative to said handle.

5. A screw driver having a handle, a bit, means for mounting said bit in said handle, said mounting means permitting rotation of said bit relative to said handle and preventing axial displacement of said bit relative to said handle, an element within said bit adapted to cooperate therewith for gripping a screw, means for rigidly securing said element to said handle, a spring for rotating said bit, a clutch comprising a clutch member on said handle and a clutch member on said bit, said spring urging said clutch member on said bit into engagement with said clutch member on said handle, said clutch members when in engagement preventing said spring from rotating said bit relative to said handle, and means mounted coaxially with respect to said bit and slidable with respect to said bit for disengaging said clutch member on said bit from said clutch member on said handle to permit said spring to rotate said bit.

References Cited in the file of this patent

UNITED STATES PATENTS

| | | |
|---|---|---|
| 1,499,491 | Weissbeck et al. | July 1, 1924 |
| 2,150,184 | Pearson | Mar. 14, 1939 |
| 2,451,696 | Sopcak | Oct. 19, 1948 |
| 2,566,683 | Thompson | Sept. 4, 1951 |

FOREIGN PATENTS

| | | |
|---|---|---|
| 534,694 | Germany | Sept. 30, 1931 |